US008078016B2

(12) United States Patent
Kruglick (10) Patent No.: US 8,078,016 B2
(45) Date of Patent: Dec. 13, 2011

(54) OPTICAL CIRCUIT DEVICE AND METHOD

(75) Inventor: Ezekiel Kruglick, Poway, CA (US)

(73) Assignee: Empire Technology Development LLC, Wilmington, DE (US)

( * ) Notice: Subject to any disclaimer, the term of this patent is extended or adjusted under 35 U.S.C. 154(b) by 225 days.

(21) Appl. No.: 12/422,172

(22) Filed: Apr. 10, 2009

(65) Prior Publication Data

US 2010/0260452 A1 Oct. 14, 2010

(51) Int. Cl.
*G02F 1/295* (2006.01)
(52) U.S. Cl. ............... 385/5; 385/1; 385/4; 385/39
(58) Field of Classification Search .................. 385/5
See application file for complete search history.

(56) References Cited

U.S. PATENT DOCUMENTS

| | | | | |
|---|---|---|---|---|
| 4,904,039 | A | 2/1990 | Soref | 350/96.14 |
| 4,957,337 | A * | 9/1990 | Ogawa et al. | 385/1 |
| 5,292,620 | A | 3/1994 | Booth et al. | |
| 5,818,983 | A | 10/1998 | Yoshimura et al. | |
| 6,081,632 | A | 6/2000 | Yoshimura et al. | |
| 7,463,804 | B2 | 12/2008 | Covey | 385/122 |
| 7,492,983 | B2 | 2/2009 | Matsubara et al. | |
| 2002/0105652 | A1 | 8/2002 | Domash et al. | 356/481 |
| 2002/0118441 | A1 | 8/2002 | Kang et al. | 359/333 |
| 2003/0002797 | A1 | 1/2003 | Chu et al. | 385/39 |
| 2003/0063362 | A1 | 4/2003 | Demir et al. | 359/240 |
| 2005/0105864 | A1 | 5/2005 | Lee et al. | 385/122 |

FOREIGN PATENT DOCUMENTS

WO 2004/017125 A1 2/2004

OTHER PUBLICATIONS

Liu, Ansheng, et al., "*High-speed optical modulation based on carrier depletion in a silicon waveguide*", Optical Society of America, vol. 15, No. 2, Jan. 22, 2007, pp. 660-668.
Soref, Richard A., "*Electrooptical Effects in Silicon*", IEEE Journal of Quantum Electronics, vol. QE-23, No. 1, Jan. 1987, pp. 123-129.
Soref, Richard A., "*Silicon-Based Optoelectronics*", Proceedings of the IEEE, vol. 81, No. 12, Dec. 1993, pp. 1687-1706.
Wilt, David M., et al., "*High efficiency indium gallium arsenide photovoltaic devices for thermophotovoltaic power systems*", American Institute of Physics: Appl. Phys. Lett., vol. 64, No. 18, May 2, 1994, pp. 2415-2416.
Xu, Qianfan, et al., "*All-optical logic based on silicon micro-ring resonators*", Optical Society of America, vol. 15, No. 3, Feb. 5, 2007, pp. 924-929.
European Search Report, Application No. 09180976.4-2205, 6 pages, May 31, 2010.
International Search Report and Written Opinion mailed Jun. 24, 2010 regarding Application No. PCT/US2010/030635.

* cited by examiner

*Primary Examiner* — Uyen-Chau N Le
*Assistant Examiner* — Chad H Smith
(74) *Attorney, Agent, or Firm* — Dorsey & Whitney LLP (57) ABSTRACT

Techniques are generally disclosed for optical devices that may be used to implement a variety of logic devices or other circuits by optical means. Example optical devices use a photodiode to alter the charge carrier concentration in a waveguide, thereby altering the index of refraction of the waveguide. The photodiode may be driven by an optical signal, which may be coupled to the photodiode through an optical waveguide. The optical signal may be configured to control the phase of coherent light coupled through the waveguide. A variety of logic devices and other circuits may be implemented by allowing the light coupled through the waveguide to constructively or destructively interfere with other coherent light.

20 Claims, 8 Drawing Sheets

| B | | | |
|---|---|---|---|
| | 0 | 1 | |
| A | | | |
| 0 | 0 | 0 | |
| 1 | 0 | 1 | Out |

OPTICAL CIRCUIT DEVICE AND METHOD

BACKGROUND

Optical devices may be used to perform logic and other circuit functions. These optical devices are generally of two different varieties, namely electro-optical devices and fully optical devices. Electro-optical devices may use an electrical signal to generate or affect the propagation of light, such as by electrically inducing an electric field in a silicon waveguide to alter the refractive index of the waveguide. These devices may have performance or other limitations such as being difficult to fabricate in a silicon substrate or consuming excessive power. Fully optical devices may generate or affect the propagation of light using an optical signal. For example, pulses of light corresponding to respective data may be combined to perform various logic functions. However, conventional fully optical devices may also have performance or other limitations. For example, such devices may use complex mechanisms such as four-wave mixing or micro-ring resonators that are difficult to fabricate using existing semiconductor fabrication techniques and equipment and may be too large to be amenable to large scale integration.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several examples in accordance with the disclosure and are, therefore, not to be considered limiting of its scope, the disclosure will be described with additional specificity and detail through use of the accompanying drawings, in which:

DETAILED DESCRIPTION

Certain details are set forth below to provide a sufficient understanding of described examples. However, it will be clear to one skilled in the art that the examples may be practiced without various of the particular details discussed. In some instances, for example, well-known circuits, control signals, and software operations have not been shown in detail in order to avoid unnecessarily obscuring the described examples.

Described herein are certain examples of optical devices and methods of making optical devices, as well as logic and other circuits using the optical devices and methods of optically performing certain functions. In some examples, the index of refraction of an optical waveguide may be altered by charge carrier concentration created by a photodiode responsive to an optical signal applied to the photodiode. As a result, the phase of coherent light coupled through the waveguide can be altered by the optical signal. By allowing the optical signal to selectively control the index of refraction of the waveguide, the light coupled through the waveguide can be made to constructively or destructively interfere with light coupled through another waveguide, thereby allowing various logic and other functions to be implemented, some but not all of which are described herein.

Figure 1:
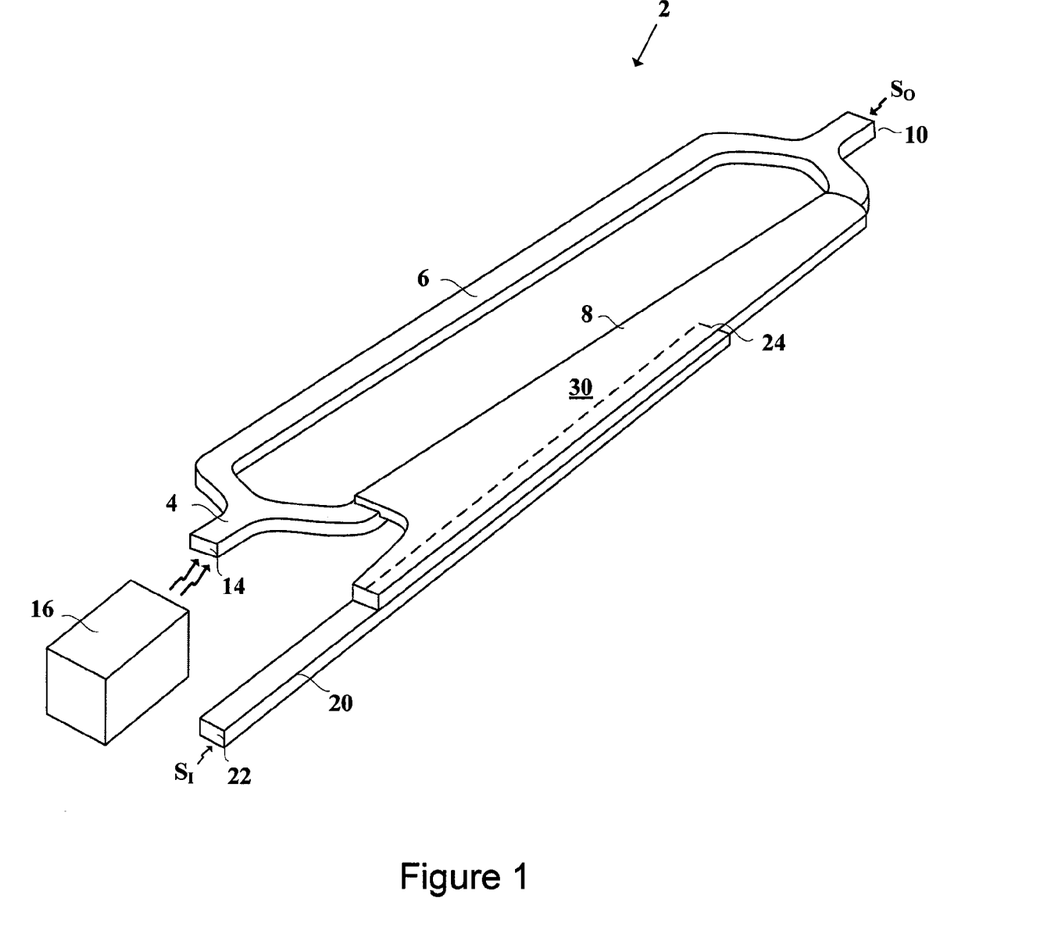
FIG. 1 is an isometric view of an example of an optical device.

FIG. 1 is an isometric view of an example of an optical device 2 arranged in accordance with the present disclosure. The optical device 2 may include a waveguide 4 that may be separated into two waveguide branches 6, 8 before rejoining into a single waveguide at an output port 10. The waveguide 4 may be fabricated from silicon, for example. The waveguide 4 may include a light supply port 14 that may receive coherent light from a light source 16. In one example, the light source 16 may be a laser diode (not shown). In another example, the light source 16 may be a laser (not shown). Other examples may use other devices for the light source 16.

The optical device 2 may include a second waveguide 20, which may also be fabricated from silicon, that may receive an optical input signal $S_I$ at an input port 22. The input signal $S_I$ may be amplitude modulated light that may be coherent with the light from the light source 16, although coherency is not required. In one example, the input signal $S_I$ may be created by modulating light from the light source 16. The second waveguide 20 may be separated from the waveguide branch 8 by a small gap 24. In one example, the gap 24 may be about 7 microns, and the waveguides 4, 6, 8 and 10 may have a width of 0.6 microns and a height of 0.5 microns. Waveguides having these dimensions may be suitable for coupling light in the 1500 nm range. However, other examples may use waveguides 4, 20 having different widths and/or heights, and they may be separated from each other by gaps 24 having other dimensions.

Once the waveguides 4, 20 have been fabricated, a layer of semiconductor material 30 may be deposited on the waveguide branch 8 and the waveguide 20 and within the gap 24. This semiconductor material 30 may absorb light at the wavelength of the light coupled through the waveguide 20. In one example, the semiconductor material 30 may be one or more of silicon and germanium, such as $Si_{0.15}Ge_{0.85}$, but other examples may use other semiconductor materials. The semiconductor material 30 may be doped by suitable means so that a first layer (not shown in FIG. 1) of the semiconductor material 30 may be P-doped and a second layer (not shown in FIG. 1) deposited on the first may be N-doped. As a result, a photodiode junction may be formed in the semiconductor material 30 at the junctions between the differently-doped materials.

In operation, the input signal $S_I$ may cause the photodiode junctions to inject charge carriers in the waveguide branch 8 thereby changing the charge carrier concentration in the waveguide branch 8. This change in the charge carrier concentration alters the refractive index of the waveguide branch 8 thereby altering the speed at which the light from the light source 16 propagates through the waveguide branch 8 to the output port 10. This change in the speed at which the light propagates through the waveguide branch 8 may alter the magnitude of an optical output signal $S_O$ at the output port 10 compared to the phase the optical output signal $S_O$ would otherwise have. Thus, the refractive index may be altered entirely by optical means as contrasted, for example, to using an electrical signal to inject charge carriers in the waveguide branch 8. Unlike the light coupled through the waveguide branch 8, the phase of the light coupled through the waveguide branch 6 may not altered. Therefore, as explained in greater detail below, by changing the phase of the light coupled through the waveguide branch 8, the light coupled through the waveguide branch 8 may constructively or destructively interfere with the light coupled through the waveguide branch 6 to implement various logic and other functions.

Figure 2:
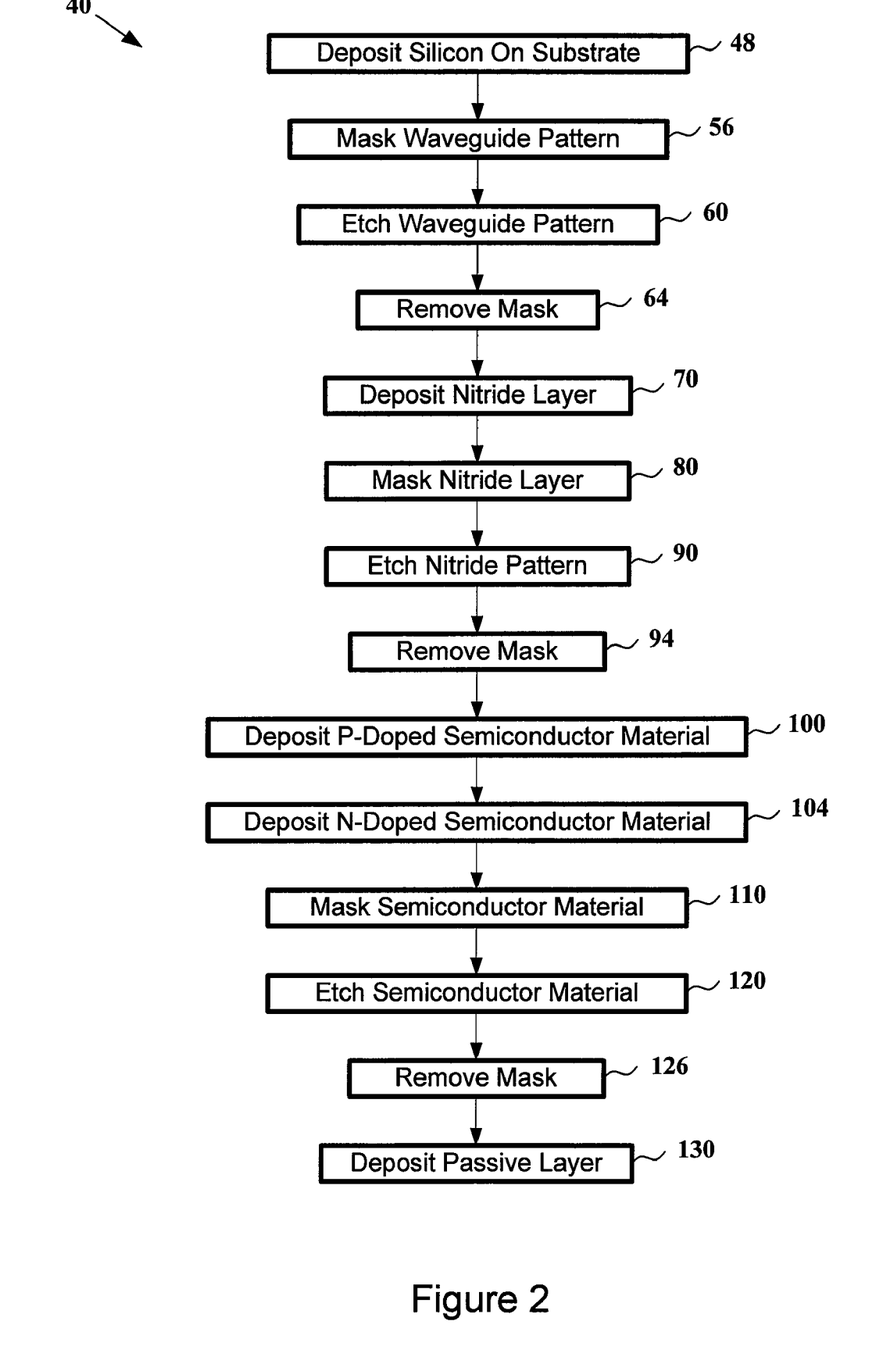
FIG. 2 is a flow chart showing an example of a method of fabricating the optical device of FIG. 1 or an optical device according to some examples.

An example of a method 40 of fabricating the optical device 2 will be described with reference to FIGS. 2 and 3A-3J. FIG. 2 is a flow chart showing an example of a method of fabricating the optical device of FIG. 1 or an optical device according to some examples, and FIGS. 3A-4J are schematic drawings showing an example of a method of fabricating the optical device of FIG. 1 or an optical device according to some additional examples, all arranged in accordance with the present disclosure.

Figure 3A:
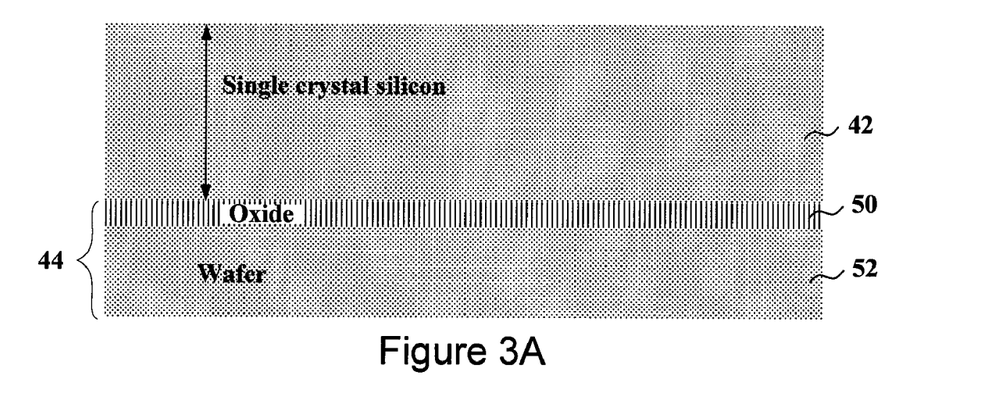
FIGS. 3A-3J are schematic drawings showing an example of a method of fabricating the optical device of FIG. 1 or an optical device according to some additional examples.
Figure 3B:
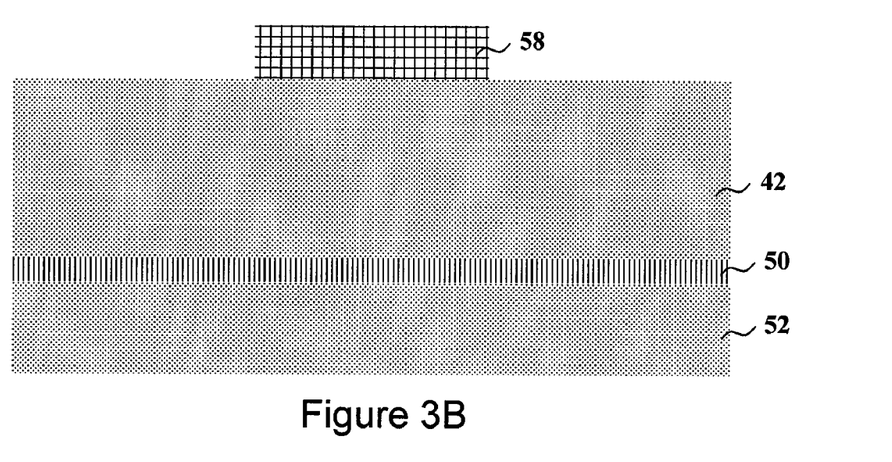
Figure 3C:
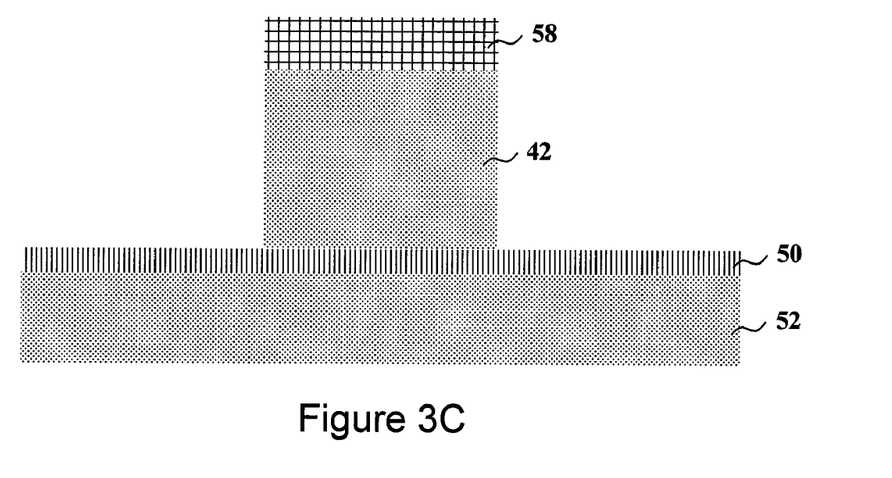

The illustrated method for fabricating may include (block 48) depositing silicon 42 on a substrate 44 as shown in FIG. 3A. As also shown in FIG. 3A, the substrate 44 upon which the silicon 42 is deposited may be formed by a layer of oxide 50, such as silicon dioxide ($SiO_2$), deposited or formed on a wafer 52, such as a silicon wafer to form a silicon-on-insulator ("SOI") structure. At block 56, the silicon may be masked in a pattern corresponding to a pattern of the waveguides 4, 20. In one example shown in FIG. 3B, the silicon may be masked by first depositing the silicon with a layer of photoresist 58, then using photolithography to expose the photoresist in a pattern corresponding to the pattern of the pattern of the waveguides 4, 20. The photoresist 58 may then be removed except in the areas corresponding to the pattern of the waveguides 4, 20. However, the silicon 42 may be masked by other means in other examples. As shown in FIG. 3C, the silicon 42 may be etched (block 60) to form the waveguides 4, 20 by removing the silicon 42 in the areas left exposed by the mask. The photoresist 58 mask may then be removed (block 64), leaving waveguides 4, 20 deposited on an insulative layer of the oxide 50.

Figure 3D:
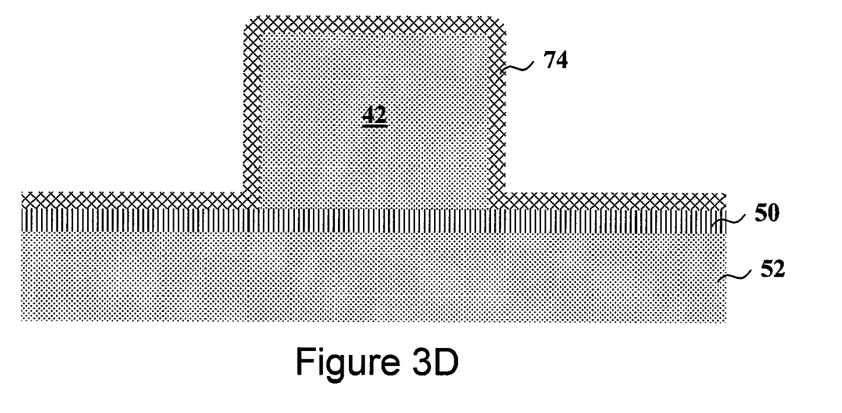
Figure 3E:
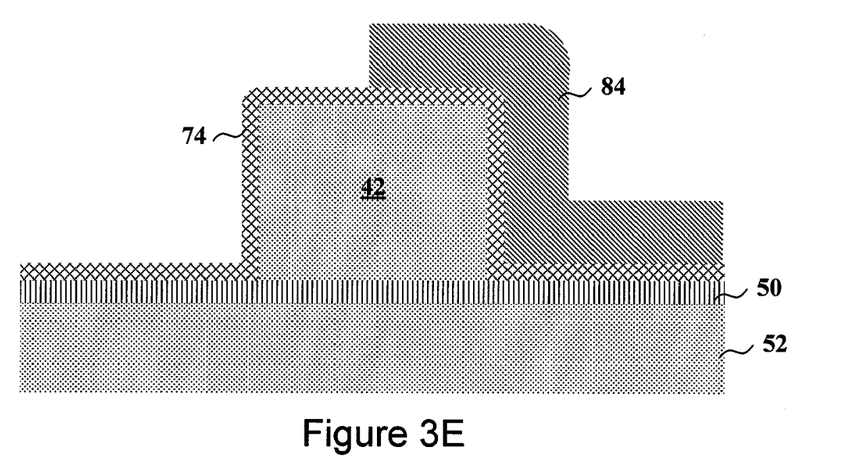

Next, as shown in FIG. 3D, a layer of nitride 74 may be deposited (block 70) over the remaining silicon 42 to form a nitride layer. The nitride layer 74 may be deposited by any suitable means. In one example, the nitride layer 74 may be deposited by low-pressure chemical vapor deposition ("LPCVD"). As shown in FIG. 3E, the nitride layer 74 may then be masked (block 80) with a pattern such as by depositing a pattern of photoresist 84 on the nitride layer 74 using photolithography, as explained above.

Figure 3F:
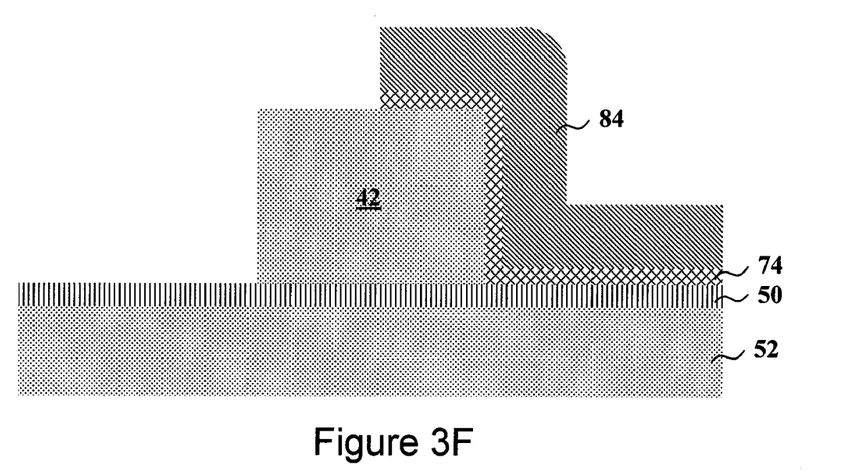
Figure 3G:
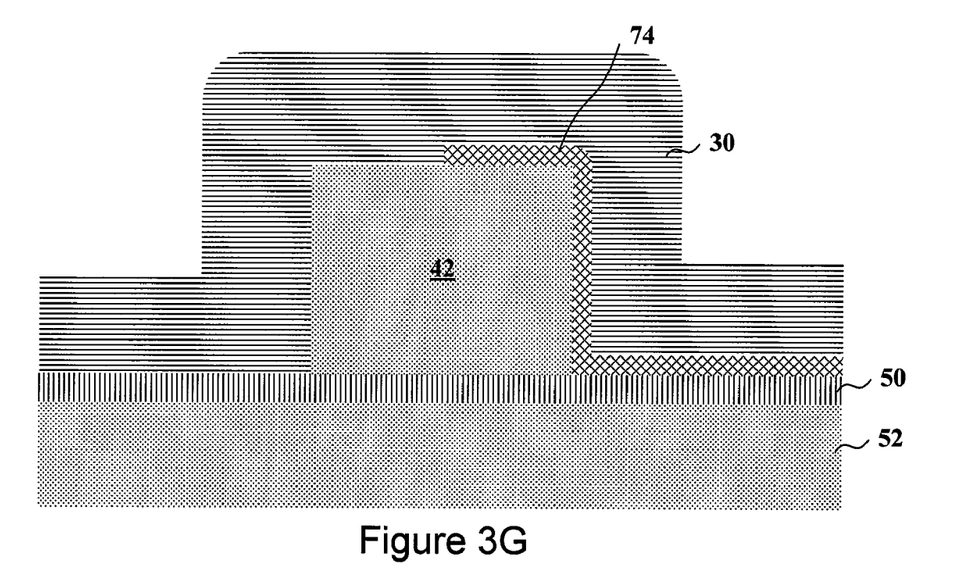

After the nitride layer 74 has been masked with a pattern (block 80), the areas of the nitride layer 74 left exposed by the photoresist 84 may be etched (block 90) to reveal an etched pattern. The photoresist 84 forming the mask may then be removed (block 94) as shown in FIG. 3F. The semiconductor material 30 may then be deposited on the exposed insulator and waveguides as shown in FIG. 3G. In one example, the semiconductor material 30 may be deposited by first depositing a layer of P-doped semiconductor material 30 at block 100. This layer of semiconductor material 30 may be P-doped by mixing the semiconductor material with boron or some other suitable material, and it may be doped before being deposited. The semiconductor material may be deposited by any suitable means, such as by LPCVD. Alternatively, in other examples, the material may be doped after the material 30 has been deposited. After the first layer of semiconductor material 30 has been deposited at block 100, a layer of N-doped semiconductor material 30 may be deposited at block 104. This material 30 may be N-doped by mixing the semiconductor material 30 with phosphorus or some other suitable material, and it may be doped before being deposited. Again, however, in other examples the semiconductor material 30 may be N-doped after being deposited. The junction between the P-doped material 30 and the N-doped material 30 may form a photodiode junction at the interface between the oppositely doped layers of semiconductor material 30. Although the example of the optical device 2 uses the layer of N-doped semiconductor material 30 deposited on the layer of P-doped semiconductor material 30, in other examples a layer of P-doped semiconductor material 30 may be deposited on the layer of N-doped semiconductor material.

Figure 3H:
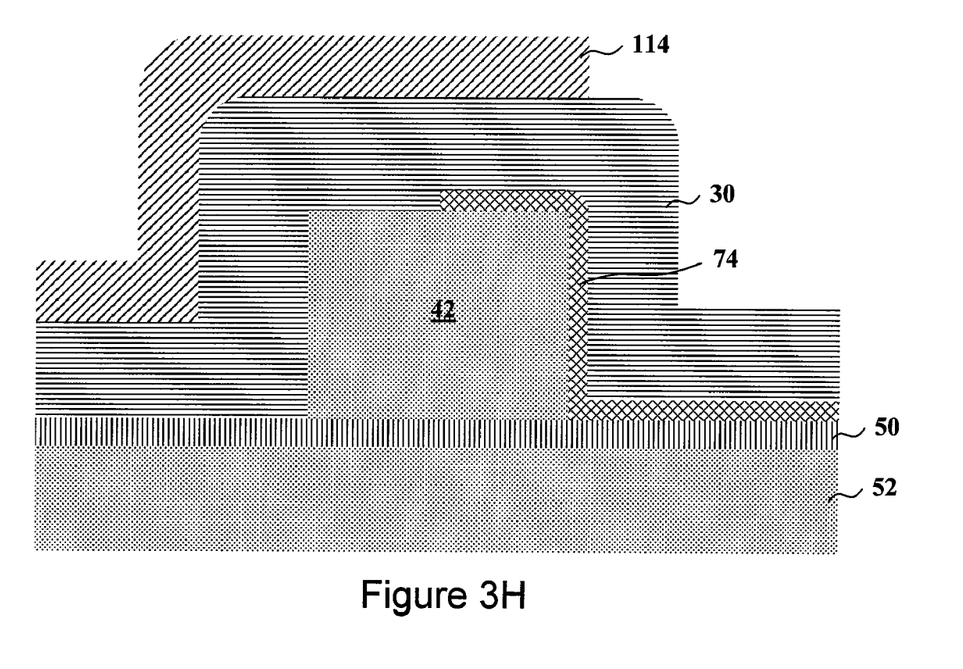
Figure 3I:
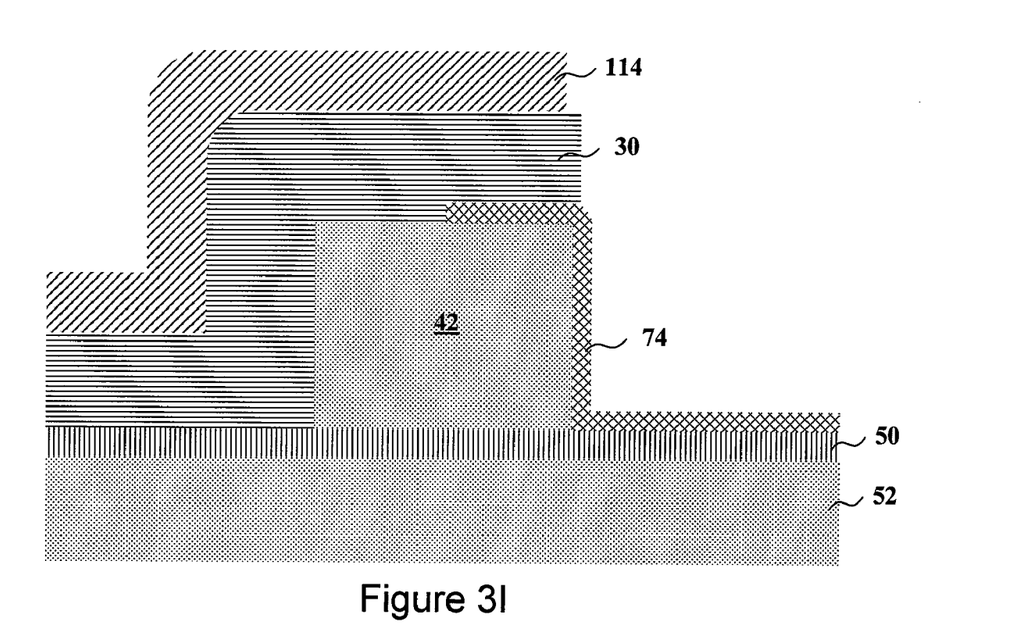
Figure 3J:
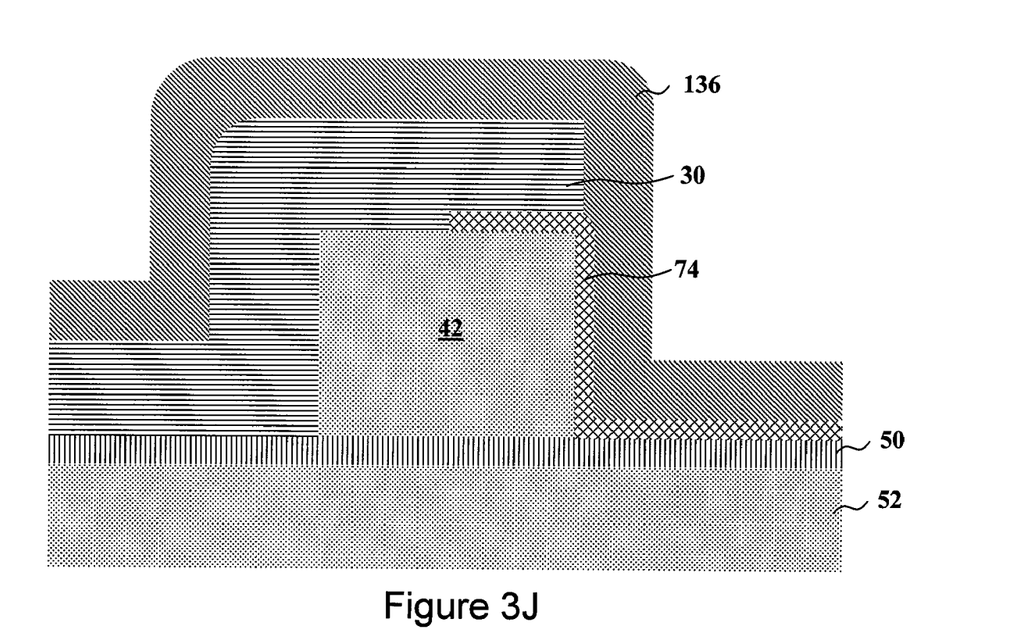

As further shown in FIG. 2 and in FIG. 3H, the semiconductor material 30 may be masked with a pattern of photoresist 114 (block 110). Next, as shown in FIG. 3I, the semiconductor material 30 may be etched (block 120) so that the semiconductor material 30 overlies one side of the silicon 42 forming the waveguide. As shown in FIG. 3J, after the mask formed by the photoresist 114 has been removed (block 126), the entire structure may be deposited with a passivation layer 136 (block 130), which, in some examples, may be a layer of oxide.

Referring again to FIG. 1, in some examples the optical input signal SI may be a digital signal that may cause the optical device 2 to rapidly alter the magnitude of the optical output optical signal $S_O$. In such case, it may be desirable to allow the injected charge carriers to leak from the waveguide branch 8 so that the refractive index of the waveguide branch 8 may be quickly changed. In such case, the method 40 may include a block (not shown) for forming a via in the deposited insulative material (e.g., the passivation layer), and the via may then be filled with a conductive mater such as a metal or polysilicon to form an electrical contact on the waveguide branch 8 from which charge carriers may be quickly removed from the waveguide branch.

The optical device 2 may be used as a stand-along device, such as an optical modulator. However, in other examples, the optical device 2 may be used in combination with other optical devices or optical components to implement a logic device or other circuit. In such examples, the optical output signal $S_O$ may be applied directly to another optical device or optical component. However, in other examples, the optical output signal $S_O$ may be applied to an electro-optical transducer (not shown) to convert the optical output signal $S_O$ to a corresponding electrical signal.

Figure 4:
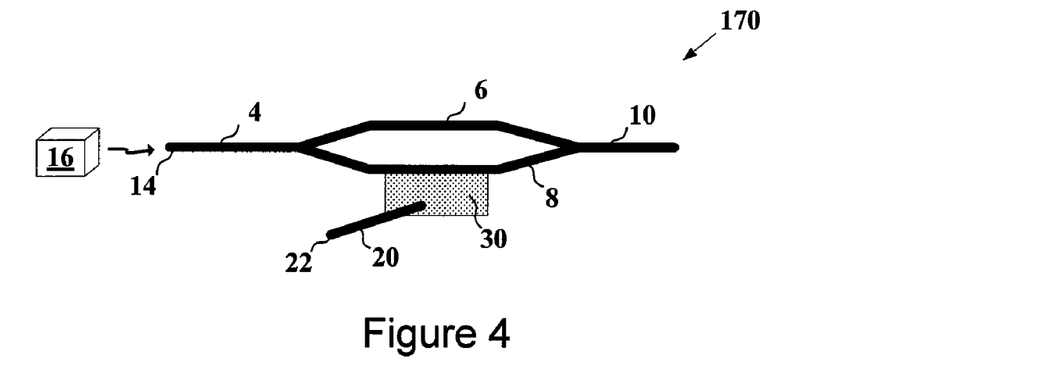
FIG. 4 is a schematic drawing of an example of an optical inverter.

A schematic of an example optical inverter 170 is shown in FIG. 4, in accordance with the present disclosure. The optical inverter 170 may be structurally identical to the optical device 2 shown in FIG. 1, although it may be designed to function as an inverter. Therefore, in the interest of clarity, the same components have been provided with the same reference numerals. The optical waveguide branch 6 may have the same length as the waveguide branch 8 so that the light from the light source 16 coupled through the waveguide branch 6 has the same phase as the output from light from the light source 16 coupled through the waveguide branch 8. As a result, the light coupled to the output port 10 through the optical waveguide branch 8 may constructively interfere with the light coupled through the waveguide branch 6 so that a relatively large amount of light may be output from the output port 10.

In operation, the optical inverter 170 may be designed so that, when light is applied to the input port 22 of the waveguide 20, the refractive index of the waveguide branch 8 may be altered. As a result, the phase of the light coupled through the waveguide branch 8 may be altered by 180 degrees (e.g., a logical inversion type of operation). In such case, the light coupled through the optical waveguide branch 8 may destructively interfere with the light coupled through the waveguide branch 6 so that substantially no light may be output from the output port 10. However, in the absence of light applied to the input port 22, the light coupled through the optical waveguide branch 8 to the output port 10 may constructively interfere with the light coupled through the optical waveguide branch so that a substantial amount of light may be output from the output port 10. The absence of light applied to the input port 22 may be considered a logic 0 and presence of light applied to the input port 22 may be considered a logic 1. The optical inverter 170 may thus optically perform a similar logical function as an electrical logic inverter since it outputs light (e.g., a logic 1) responsive to no input light (e.g., a logic 0) and it outputs substantially no light (e.g., a logic 0) responsive to the presence of input light (e.g., a logic 1).

When the optical device 2 is used as an inverter, the optical signal applied to the input port 22 may be a digital signal. However, the optical device 2 may also function as an optical amplifier by applying an analog optical signal to the input port 22 and by using a light source 16 applying light having a greater intensity to the light supply port 14. As a result, relatively small changes in the intensity of the optical signal applied to the input port 22 may cause significantly greater changes in the light exiting the output port 10. Thus, the optical device 2 may perform an optical amplifying function analogous to in the manner in which an amplifier performs an electrical amplifying function.

Figure 5:
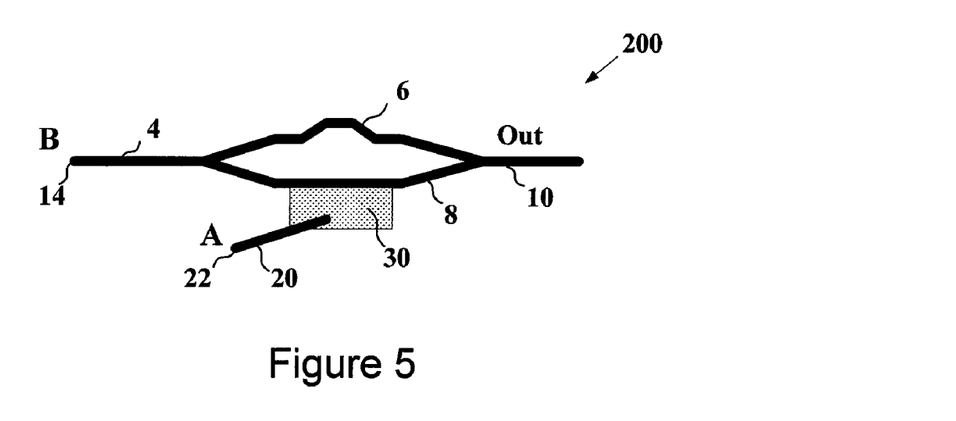
FIG. 5 is a schematic drawing of an example of an optical AND gate.

In another example shown in FIG. 5, the optical device 2 may be used to implement an example of an optical AND gate 200 in accordance with the present disclosure. The optical AND gate 200 may have the same basic structure as the inverter 170 except for two differences. First, instead of applying light from the light source 16 to the input port 14, a second optical input signal "B" may be applied to the input port although a first optical signal "A" is still applied to the first input port 22. Second, the waveguide branch 6 may be longer than the length of the waveguide branch 8 by a distance that causes the phase of the light coupled through the waveguide branch 6 to be 180 degrees greater than the phase of the light coupled through the waveguide branch 8 when the refractive index of the waveguide branch 8 is not altered.

Figure 6:
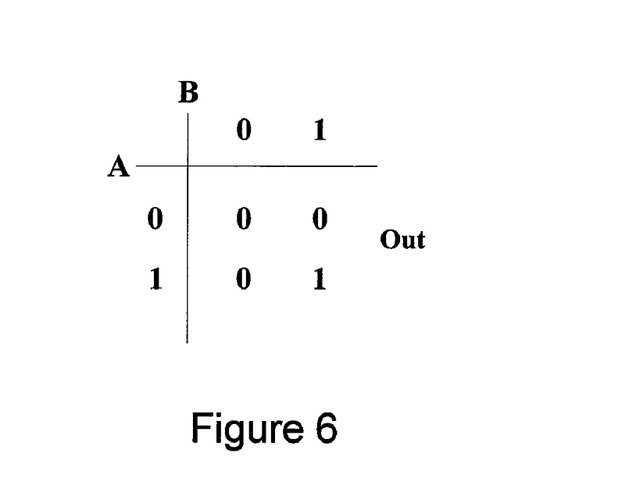
FIG. 6 is a truth table illustrating the operation of the optical AND gate of FIG. 5.

The operation of the optical AND gate 200 is illustrated by the truth table shown in FIG. 6. As shown therein, when the first input signal "A" applied to input port 22 is a logic 0, which may correspond to no light being input, the optical output ("Out") at output port 10 is also a logic 0 regardless of the state of the second input "B" at input port 14 This is the case because the optical output will be considered a logic 0 if no light is being applied to the input port 14 (i.e., B=0) since there will be no light present to be coupled to the output port 10. On the other hand, if light is being applied as the second input signal "B" to the input port 14 (i.e., B=1), the light coupled through the waveguide branch 6 may destructively interfere with the light coupled through the waveguide branch 8 because the phases of the light coupled through the waveguide branches 6, 8 differ from each other by 180 degrees. As a result, no light is observed at the output port 10 so the optical output (e.g., "Out") is a logic 0, as shown in FIG. 6.

As also shown in FIG. 6, when the second input signal "B" at input port 14 is a logic 0, the optical output (e.g., "Out") is also a logic 0 regardless of the state of the first input signal "A" at input port 22. This will be the case because, as explained above, if B=0, no light is being applied to the input port 14 so there will be no light present to be coupled to the output port 10.

Finally, as also shown in FIG. 6, if the first input signal "A" at input port 22 is a logic 1 and the second input signal "B" at input port 14 is also a logic 1, the light coupled through the waveguide 20 may increase the phase of the light coupled through the waveguide branch 8 by 180 degrees so that it constructively interferes with the light coupled through the waveguide branch 6. As a result, the optical output "Out" at output port 10 will be a logic 1.

Figures 7, 8:
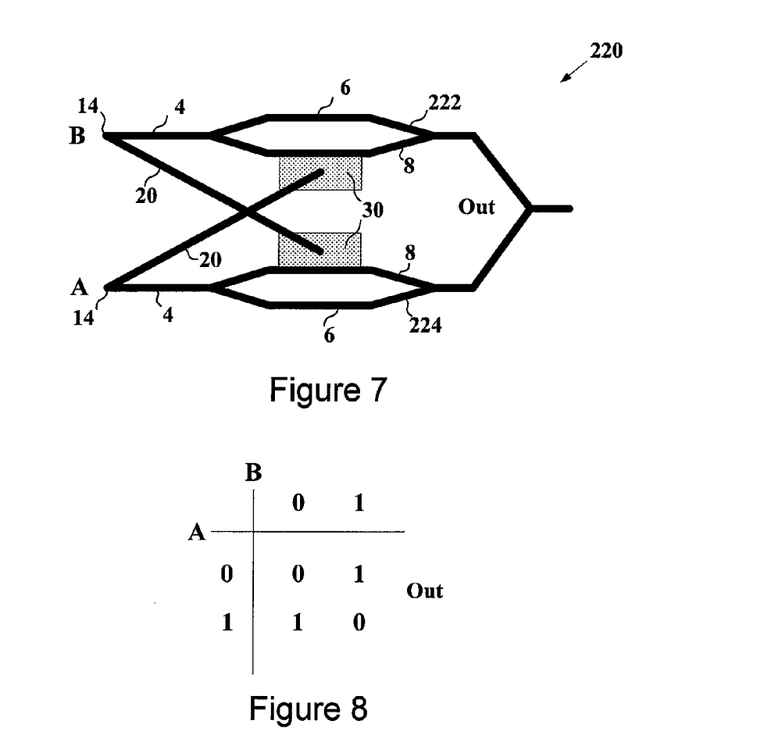
FIG. 7 is a schematic drawing of an example of an optical exclusive-OR gate.
FIG. 8 is a truth table illustrating the operation of the optical exclusive-OR gate of FIG. 7.

In another example, the optical device 2 may be used to implement an example of an optical exclusive-OR gate 220 as shown in FIG. 7, arranged in accordance with the present disclosure. The exclusive-OR gate 220 may utilize two identical optical devices 222, 224 with their input ports A, B cross-coupled with each other. Each of the optical devices 222, 224 may be structurally similar to the optical inverter 170.

The logical functions of the optical exclusive-OR gate 220 is illustrated in FIG. 8. If both of the input signals A, B applied to input ports 14 are logic 0, then the optical output "Out" will be a logic 0 since there will then be no light being applied to either of the optical devices 222, 224. If only one of the input signals A or B is logic 1, then the light corresponding to logic 1 coupled through the waveguide branches 6, 8 of the devices 222 or 224 that receives the light at its input port 14 constructively interferes with each other since the phase of the light coupled through the waveguide branch 6 is not altered because the other one of the input signals A or B will be logic 0. However, no light may be coupled through the other one of the optical devices 222 or 224 because no light is being applied to the input port 14 of that device. Nevertheless, sufficient light is coupled through one of the optical devices 222 or 224 so that optical output "Out" is a logic 1. For example, if A=1 and B=0, the refractive index of the waveguide branch 8 in the device 224 is not altered since B=0. As a result, the light coupled through the waveguide branch 8 of the optical device 224 constructively interferes with the light coupled through the waveguide branch 6 of the optical device 224. However, since no light is being applied to the input port 14 of the optical device 222, no light is coupled through the waveguide branches 6, 8 of the optical device 222. However, sufficient light may be coupled through the optical device 224 to provide an optical output "Out" that may be considered a logic 1.

As also shown in FIG. 8, if both A and B input signals at input ports 14 are logic 1, then the optical output "Out" will be logic 0. The optical output "Out" will be a logic 0 because the phase of the light coupled through the waveguide branch 8 of each optical device 222 or 224 is increased by 180 degrees because of the light coupled through the waveguide 20 of the other optical device 222 or 224. As a result, the light coupled thorough the waveguide branches 6, 8 of each device 222, 224 may destructively interferes with each other. For example, since input signal A at input port 14 is a logic 1, the phase of the light coupled through the waveguide branch 6 of the optical device 222 is increased by 180 degrees so that it destructively interferes with the light coupled through the waveguide branch 8 of the optical device 222.

Figure 9:
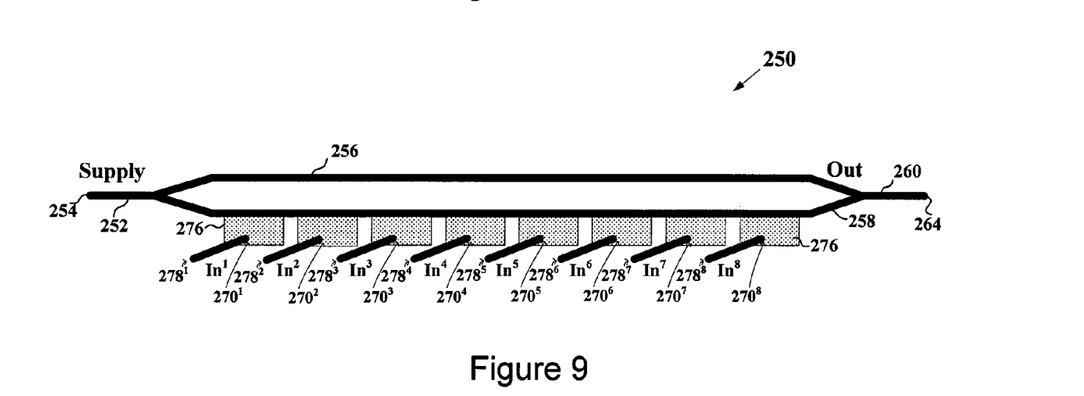
FIG. 9 is a schematic drawing of an example of an optical digital-to-analog converter, all arranged in accordance with the present disclosure.

The optical device 2 may be used to implement a wide variety of other logic and circuit devices. For example, a plurality of the optical devices 2 may be used to implement a digital-to-analog ("D/A") converter 250 as shown in FIG. 9. The D/A converter 250 includes a light supply waveguide 252 having an input port 254 that branches into a first waveguide 256 and a second waveguide 258, both of which may have the same length. The waveguides 256, 258 may join each other to form an output waveguide 260 having an output port 264. A plurality of photodiodes $270^{1-8}$ formed by respective layers of semiconductor material 276 may be spaced apart along the length of the second waveguide 258. Each of the photodiodes $270^{1-8}$ may receive light through a respective input waveguide $278^{1-8}$, each of which may receive a respective digital input signal $IN^{1-8}$.

In operation, each digital input signals $IN^{1-8}$ that is a logic 1 may cause the phase of the light coupled through the waveguide 258 to be increased by an incremental amount. If none of the digital input signals are a logic 1 then the light coupled through the waveguide 256 constructively interferes with the light coupled through the waveguide 258 thereby producing a relatively large amount of light at the output port 264. As each of the input signals $IN^{1-8}$ transitions to a logic 1, destructive interference may increase to incrementally reduce the magnitude of the light at the output port 264. As a result, the magnitude of the light at the output port 264 may correspond to the number of digital input signals $IN^{1-8}$ that are logic 1.

In the example of the D/A converter 250 shown in FIG. 9, the length of the semiconductor material 276 forming all of the photodiodes $270^{1-8}$ may be the same. However, in other examples, the input signals $IN^{1-8}$ may be "weighted" by fabricating the respective photodiodes with different lengths of the semiconductor material 276 extending along the length of the waveguide 258.

The foregoing detailed description has set forth various examples of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. However, those skilled in the art will recognize that some aspects of the examples disclosed herein, in whole or in part, can be equivalently implemented with other devices or methods.

Those skilled in the art will recognize that it is common within the art to describe devices and/or processes in the fashion set forth herein, and thereafter use engineering practices to integrate such described devices into other systems.

The herein described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to examples containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and examples have been disclosed herein, other aspects and examples will be apparent to those skilled in the art. The various aspects and examples disclosed herein are for purposes of illustration and are not intended to be limiting, with the true scope and spirit being indicated by the following claims.

I claim:

1. An optical circuit device, comprising:
   a first optical waveguide including first and second waveguide branches;
   a second optical waveguide separated from the first optical waveguide by a gap; and
   a semiconductor material extending between the first optical waveguide and the second optical waveguide, the semiconductor material forming a photodiode junction structured to alter the refractive index of at least one of the first or second waveguide branches in response to light coupled to the semiconductor material through the second optical waveguide.

2. The optical circuit device of claim 1 wherein the first and second optical waveguides comprise respective silicon optical waveguides.

3. The optical circuit device of claim 1 wherein the semiconductor material comprises one or more of silicon and germanium.

4. The optical circuit device of claim 1 wherein the first and second optical waveguides are structured to preferentially coupled light at a first wavelength.

5. The optical circuit device of claim 4 wherein the semiconductor material is operable to preferentially absorb light at the first wavelength.

6. An optical circuit adapted for operation with light from a light source and in response to an optical signal, the optical circuit comprising:
   a first optical waveguide having a light supply port and an output port, the first optical waveguide separating into first and second waveguide branches between the light supply port and the output port, wherein the light supply port is adapted to receive light from the light source;
   a second optical waveguide having an input port and an output port, the output port of the second optical waveguide being separated from the first waveguide branch by a gap; and
   a semiconductor material extending between the output port of the second optical waveguide and the first waveguide branch of the first optical waveguide, the semiconductor material forming a photodiode junction structured to alter the refractive index of the first waveguide branch of the first optical waveguide responsive to the optical signal received by the input port of the second optical waveguide and coupled through the second optical waveguide to the semiconductor material.

7. The optical circuit device of claim 6 wherein the optical signal comprises amplitude modulated light.

8. The optical circuit device of claim 6 wherein the light from the light source comprises coherent light, and wherein the optical signal comprises light that is coherent with the light from the light source.

9. The optical circuit device of claim 6 wherein the amplitude modulated light comprises a digitally modulated optical signal.

10. The optical circuit device of claim 6 wherein the length of the first waveguide branch is substantially equal to the length of the second waveguide branch.

11. The optical circuit device of claim 6 wherein the length of the first waveguide branch is different from the length of the second waveguide branch by substantially one-half wavelength of the light from the light source.

12. The optical circuit device of claim 6 wherein the semiconductor material is operable responsive to the optical signal to alter the refractive index of the first waveguide branch of the first optical waveguide by one-half wavelength of the light from the light source.

13. The optical circuit device of claim 6 wherein the optical signal comprises a first digital optical signal, and the light from the light source comprises a second digital optical signal, and wherein the optical circuit device further comprises:
   a third optical waveguide having an input port and an output port, the third optical waveguide separating into first and second waveguide branches between the light supply port and the output port, the output port of the third optical waveguide being coupled to the output port of the first optical waveguide to provide a common output port, the input port of the third optical waveguide receiving the first digital optical signal;
   a fourth optical waveguide having an input port and an output port, the output port of the fourth optical waveguide being separated from the first waveguide branch of the third optical waveguide by a second gap; and
   a second semiconductor material extending between the output port of the fourth optical waveguide and the first waveguide branch of the third optical waveguide, the second semiconductor material forming a photodiode junction structured to alter the refractive index of the first waveguide branch of the third optical waveguide responsive to the first digital optical signal received by the input port of the fourth optical waveguide and coupled through the fourth optical waveguide to the second semiconductor material.

14. The optical circuit of claim 13 wherein the length of the first branch of the first optical waveguide is substantially equal to the length of the second branch of the first optical waveguide, wherein the length of the first branch of the third optical waveguide is substantially equal to the length of the second branch of the third optical waveguide, wherein the length of the first optical waveguide from the input port of the first optical waveguide to the output port of the first optical waveguide is substantially equal to the length of the third optical waveguide from the input port of the third optical waveguide to the output port of the third optical waveguide, and wherein the semiconductor materials are operable responsive to the first and second digital optical signals to alter the refractive index of the first waveguide branch of the first optical waveguide and the refractive index of the first branch of the third optical waveguide, respectively, by one-half wavelength of light comprising the second and first digital optical signals respectively.

15. The optical circuit device of claim 6, further comprising:
a plurality of additional optical waveguides each of which have an input port and an output port, the respective output ports of the additional optical waveguides being separated from the first waveguide branch of the first waveguide by respective gaps at respective locations spaced along the length of the first waveguide branch; and
semiconductor material extending between the output port of each of the additional optical waveguides and the first waveguide branch of the first optical waveguide, the semiconductor material forming respective photodiode junctions structured to alter the refractive index of the first waveguide branch of the first optical waveguide responsive to respective optical signals received by the input port of the respective additional optical waveguides.

16. The optical circuit device of claim 15 wherein the semiconductor material extending between the output port of each of the additional optical waveguides and the first waveguide branch of the first optical waveguide are structured to equally alter the refractive index of the first waveguide branch of the first optical waveguide responsive to the respective optical signals.

17. A method of optically performing a function, comprising:
coupling light through a first optical waveguide from an input port to an output port, the optical waveguide separating into first and second waveguide branches between the input port and the output port;
coupling light through a second optical waveguide separated from the first waveguide branch by a gap; and
optically altering the refractive index of the first waveguide branch of the first optical waveguide using a photodiode junction formed in the gap.

18. The method of claim 17 wherein optically altering the refractive index of the first waveguide branch comprises coupling light to the photodiode junction formed by semiconductor material in the gap between the first waveguide branch of the first optical waveguide and the second optical waveguide.

19. A method of fabricating an optical circuit device, comprising:
placing silicon on a substrate;
etching the silicon to form a first optical waveguide on the substrate, wherein the etching forms a first optical waveguide that is separated into first and second waveguide branches between an input port and an output port, the etching further forming a second optical waveguide having an input port and an output port separated from the first waveguide branch by a gap;
placing a first layer of semiconductor material on the first and second waveguides between the output port of the second optical waveguide and the first waveguide branch of the first optical waveguide, the first layer of semiconductor material being doped to form one of P-doped semiconductor material or N-doped semiconductor material; and
placing a second layer of semiconductor material on first layer of semiconductor material, the second layer of semiconductor material being doped to form the other of P-doped semiconductor material or N-doped semiconductor material.

20. The method of claim 19 wherein the act of depositing a first layer of semiconductor material doped to form one of P-doped semiconductor material or N-doped semiconductor material comprises doping the semiconductor material before being deposited, and wherein the act of depositing a second layer of semiconductor material doped to form the other of P-doped semiconductor material or N-doped semiconductor material comprises doping the semiconductor material before being deposited.

* * * * *

UNITED STATES PATENT AND TRADEMARK OFFICE
CERTIFICATE OF CORRECTION

PATENT NO.         : 8,078,016 B2
APPLICATION NO.    : 12/422172
DATED              : December 13, 2011
INVENTOR(S)        : Kruglick Page 1 of 1

It is certified that error appears in the above-identified patent and that said Letters Patent is hereby corrected as shown below:

In Column 2, Line 58, delete "$S_I$may" and insert -- $S_I$ may --, therefor.

In Column 4, Line 28, delete "SI" and insert -- $S_I$ --, therefor.

In Column 10, Line 52, in Claim 14, delete "circuit of" and insert -- circuit device of --, therefor.

Signed and Sealed this
Fifteenth Day of May, 2012

David J. Kappos
*Director of the United States Patent and Trademark Office*